US 7,117,249 B1

(12) United States Patent  
Kitamura et al.

(10) Patent No.: US 7,117,249 B1  
(45) Date of Patent: Oct. 3, 2006

(54) COMPUTER SYSTEM AND DATA SHARING METHOD BETWEEN COMPUTERS

(75) Inventors: Manabu Kitamura, Yokohama (JP);  
Kenji Yamagami, Los Gatos, CA (US);  
Akira Yamamoto, Cupertino, CA (US);  
Minoru Kosuge, Odawara (JP)

(73) Assignee: Hitachi, Ltd., Tokyo (JP)

( * ) Notice: Subject to any disclaimer, the term of this patent is extended or adjusted under 35 U.S.C. 154(b) by 254 days.

(21) Appl. No.: 09/697,088

(22) Filed: Oct. 25, 2000

(30) Foreign Application Priority Data

Mar. 24, 2000 (JP) ............................ 2000-088509

(51) Int. Cl.  
*G06F 15/167* (2006.01)  
*G06F 17/30* (2006.01)  
*G06F 13/00* (2006.01)

(52) U.S. Cl. .................. 709/215; 707/204; 711/162  
(58) Field of Classification Search ................ 709/213, 709/214, 216, 215; 711/147, 148, 149, 150, 711/152, 154, 162; 707/200, 202, 204  
See application file for complete search history.

(56) References Cited

U.S. PATENT DOCUMENTS

| | | | |
|---|---|---|---|
| 5,339,427 A * | 8/1994 | Elko et al. ................. | 709/103 |
| 5,404,482 A * | 4/1995 | Stamm et al. .............. | 711/145 |
| 5,452,448 A * | 9/1995 | Sakuraba et al. ........... | 707/201 |
| 5,568,628 A * | 10/1996 | Satoh et al. ................ | 711/113 |
| 5,758,125 A * | 5/1998 | Misinai et al. ............. | 703/23 |
| 5,848,241 A * | 12/1998 | Misinai et al. ............. | 709/213 |
| 5,909,692 A * | 6/1999 | Yanai et al. ................ | 711/4 |
| 5,958,078 A * | 9/1999 | Yamamoto et al. ......... | 714/766 |
| 6,032,216 A * | 2/2000 | Schmuck et al. ........... | 710/200 |
| 6,101,497 A * | 8/2000 | Ofek ......................... | 707/10 |
| 6,131,148 A * | 10/2000 | West et al. ................. | 711/162 |
| 6,209,002 B1 * | 3/2001 | Gagne et al. ............... | 707/204 |

(Continued)

FOREIGN PATENT DOCUMENTS

JP 05-197496 A 8/1993

(Continued)

OTHER PUBLICATIONS

"Main Frames 98"; Nikkei Computer Magazine; pp. 214-216; (translated from Japanese to English).

(Continued)

*Primary Examiner*—Saleh Najjah  
*Assistant Examiner*—Kevin T Bates  
(74) *Attorney, Agent, or Firm*—Townsend and Townsend and Crew LLP

(57) ABSTRACT

A data sharing method for use in a computer system provided with a first computer, a second computer and a data storage subsystem for connection with the first and second computers is disclosed. The data storage subsystem has a plurality of memory units and a control unit for controlling the plurality of memory units. The control unit forms a paired state of a first memory unit storing data for use by the first computer and a second memory unit, the paired state being so controlled as to match the contents of the first memory unit and those of the second memory unit. When data used by the first computer are to be used by the second computer, the control unit releases the paired state between the first memory unit and the second memory unit to stop updating of the first memory unit to be reflected in the second memory unit. After that, the control unit re-maps a third memory unit used by the second computer and the second memory unit with each other, and so performs control that the access by the second computer to the third memory unit be made to the second memory unit.

14 Claims, 9 Drawing Sheets

U.S. PATENT DOCUMENTS

| | | | |
|---|---|---|---|
| 6,253,295 B1 * | 6/2001 | Beal et al. | 711/162 |
| 6,324,654 B1 * | 11/2001 | Wahl et al. | 714/6 |
| 6,341,333 B1 * | 1/2002 | Schreiber et al. | 711/114 |
| 6,381,674 B1 * | 4/2002 | DeKoning et al. | 711/113 |
| 6,401,178 B1 * | 6/2002 | Gagne et al. | 711/162 |
| 6,529,944 B1 * | 3/2003 | LeCrone | 709/211 |
| 6,594,744 B1 * | 7/2003 | Humlicek et al. | 711/162 |
| 6,631,442 B1 * | 10/2003 | Blumenau | 711/112 |

FOREIGN PATENT DOCUMENTS

| | | |
|---|---|---|
| JP | 06-175788 A | 6/1994 |
| JP | 11-007360 A | 1/1999 |

OTHER PUBLICATIONS

US 5,907,858, 05/1999, Kanda et al. (withdrawn)

* cited by examiner

COMPUTER SYSTEM AND DATA SHARING METHOD BETWEEN COMPUTERS

BACKGROUND OF THE INVENTION

This invention relates to a system for sharing data among storage systems in data processing systems or the like, and more particularly to a method of sharing data in a computer system which has a data storage subsystem with a plurality of interfaces.

"Downsizing" or causing an open system such as a personal computer (PC) or a workstation to carry out operations which were handled by a mainframe, has become an extensively adopted practice in recent years. Because a large quantity of information from past operations is stored in a mainframe, however, there is a demand for accessing that accumulated information from a small computer such as a PC.

The supplement Mainframe '98 (p. 214) to Nikkei Computer, a magazine published by Nikkei BP, carries an article on a case of composite configuration of a mainframe and an open system for a computer system used in corporate offices. In the computer system the article describes, the mainframe processes sales information, and the resulting accumulated data are collected and transferred once a day to a computer on the open system side via a network. This allows the user to refer to the data on the computer on the open system side. This arrangement enables data on core operations handled by the mainframe to be accessed from the open system. During such an access in this system, the current operation handled by the mainframe is suspended, and all the data are copied via the network. The greater the quantity of data handled, the longer the time required for copying. This results in heavier loads on host computer and the network, which may cause interruption in operations.

One solution to this problem is accessing a single disk unit (volume) by a plurality of host computers. Japanese Published Unexamined Patent Application No. 9-258908 discloses a disk apparatus having a plurality of interfaces and a method by which such a disk apparatus is accessed by host computers connected to the plurality of interfaces. According to this technique, copying of data between systems is dispensed with, and the load on host computer can be reduced accordingly.

SUMMARY OF THE INVENTION

As stated above, a plurality of host computers can access a common disk unit. For data to be actually usable, however, the data should be logically consistent. For instance, when data for a given file are being updated from the mainframe, if data of that file are read from the open system, inconsistent data may be read in. For this reason, reading file data from the open system should be carried when a transaction made on the mainframe side finishes and while the contents of data written in the disk unit remain consistent. The contents of data remain consistent, however, only for a very short time between the completion of one transaction and the beginning of the next transaction. Therefore, even according to Application No. 9-258908, unless the processing on the mainframe side is in an off-line state and the consistency of the contents of data is maintained for a certain period of time, it is virtually impossible to read from another host computer and use data stored in a common disk unit.

This invention enables different host computers to access a common file while minimizing the need to interrupt the execution of application software. To achieve this, in a computer system provided with a first computer, a second computer and a data storage subsystem connected to the first and the second computer, a second memory unit is prepared with the same contents as the first memory unit used by the first computer and its contents are made usable from the second computer. Preferably, the second memory unit is controlled to reflect the updating of the first memory unit from the first computer in normal processing by the first computer. When making the contents of the second memory unit available to the second computer, control is performed so as not to allow the updating of the first memory unit to be reflected in the second memory unit.

According to another aspect of the invention, the second memory unit is replaced by a third memory unit which has been used by the second computer to enable the second memory unit to be used from the second computer. According to a further aspect of the invention, the contents of the second memory unit are copied into the third memory unit, which is replaced by a fourth memory unit which has been used by the second computer.

According to still another aspect of the invention, the second memory unit holds a copy of the contents of the first memory unit at a certain time. When the contents of the first memory unit are updated, the updated contents are recorded into the third memory unit. To enable the contents of the first memory unit to be used from the second computer, the contents of the second memory unit are rewritten on the basis of the updated contents recorded in the third memory unit, and the same contents as those of the first memory unit are prepared in the second memory unit. By replacing the second memory unit whose contents have been prepared in this manner with the fourth memory unit which has been used by the second computer, its contents are made available for use from the second memory unit. This configuration enables the second computer to use the data which has been accessed by the first computer.

DESCRIPTION OF THE SPECIFIC EMBODIMENTS

Figure 1:
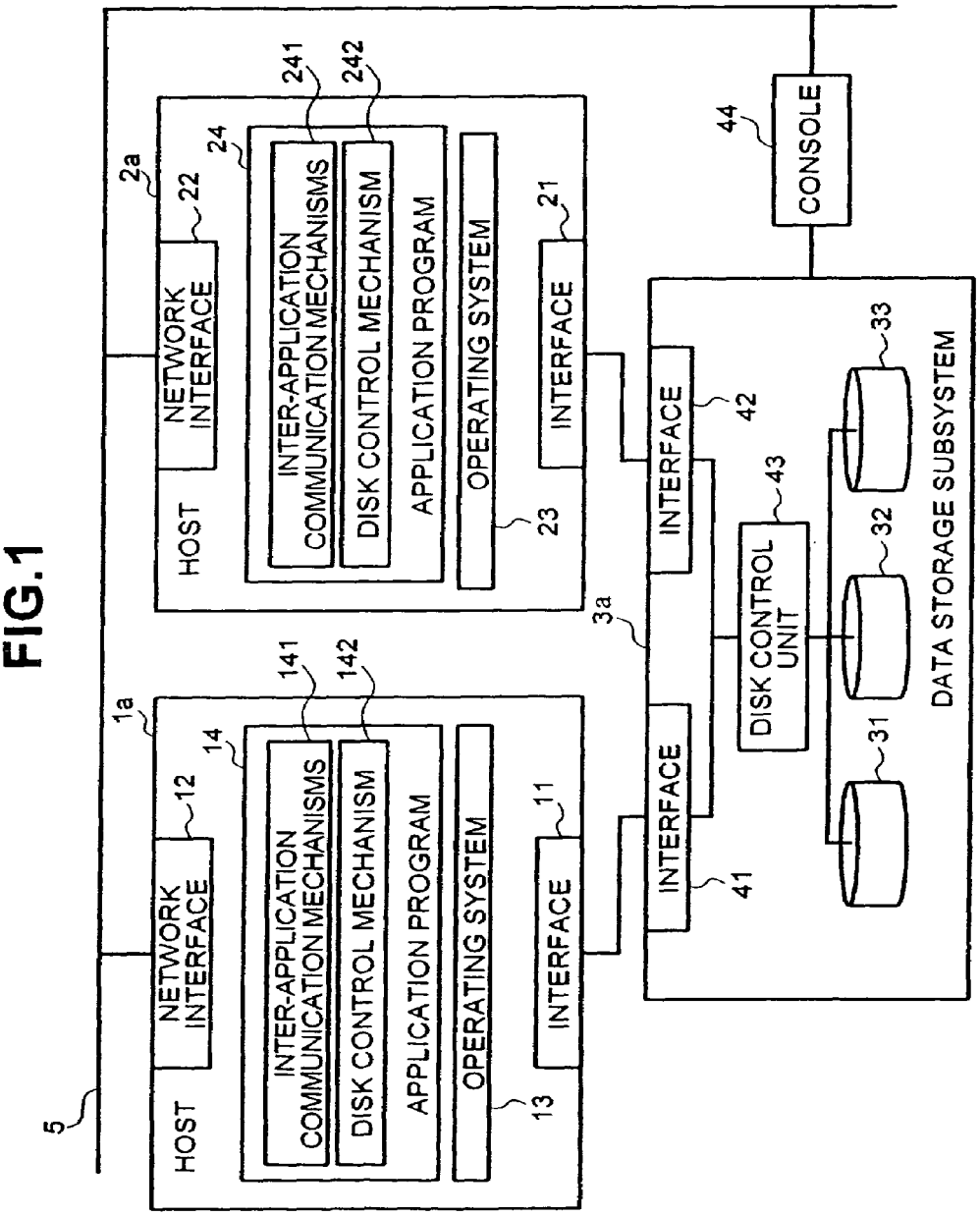
FIG. 1 is a block diagram illustrating a computer system of a first embodiment the present invention.

FIG. 1 is a functional block diagram illustrating a configuration to which a computer system in one mode of implementing the invention is applied. This computer system embodiment of the invention consists of a host computer (herein "host") 1a, a host 2a, a data storage subsystem 3a which is connected to host 1a, to host 2a, and to a network 5.

In host 1a, there is an interface 11 to the data storage subsystem 3a, a network interface 12, an operating system 13, and an application program 14. Host 1a, as well as similar units described herein, includes hardware, such as a CPU and memories, of conventional computer systems, and therefore are not described further herein. The operating system 13 and the application program 14 are stored in memories (not shown) and provide support for the various functions executed by the CPU.

Host 2a includes an interface 21 to the data storage subsystem 3a, a network interface 22, an operating system 23 and an application program 24. The operating system 23 and the application program 24, like the operating system 13 and the application program 14, respectively, are stored in memories and correspond to those in host 1a.

The data storage subsystem 3a includes a plurality of disks 31, 32 and 33, an interface 41 connected to host 1a, an interface 42 connected to host 2a, a disk control unit 43, and a console 44. The disks 31, 32 and 33 may be real or virtual magnetic disk units independent of each other, or when viewed from hosts, appear as logical disk units (logical volumes) or a disk array. In the latter case, each of the disks 31, 32 and 33 is a logical volume. In this embodiment, it is assumed that host 1a can access the disk 31 and host 2a, as well as disks 32 and 33.

The disk control unit 43 provides a disk mirroring function and a disk re-mapping function. The mirroring function permits copying the contents of a disk at a given time and saving it to another disk. As a specific example of the mirroring function, consider copying the contents of disk 31 to disk 32. In the following description, the source disk 31 is termed the original disk, while the destination disk 32 is termed the subordinate disk.

The user instructs the data storage subsystem 3a to correlate the disks 31 and 32 as original and subordinate disks, respectively, and to start copying. This processing is referred to as pairing. This instruction is issued either, for example, from host 1a via the interface 11 or from the console 44. Where the instruction is issued from the console 44, either the user may directly operate the console 44 to issue the instruction, or issue the instruction from host 1a via the network to the console 44, in response to which the console could issue the instruction to the data storage subsystem 3a. This embodiment will be described here based on the assumption that the instruction is issued from host 1a via the network to the console 44, and copying is started in accordance with the instruction from the console. Either way the pertinent function according to the invention can be realized.

When pairing is instructed, disk control unit 43 copies data from disk 31 to disk 32. At the start of copying, referred to as "being paired," the contents of the disks 31 and 32 are not identical. Thus the data storage subsystem 3a copies data from disk 31 to disk 32. During this process, the disk control unit 43 accepts a read/write access, if any, from host 1a to the disk 31. When there is a write access from host 1a and the contents of the disk 31 are updated, the disk control unit 43 causes the updated contents to be reflected in the disk 32.

When copying has been completed, and the contents of disk 31 have been copied to disk 32, the state is termed "duplex state." If there is a write access from host 1a to the disk 31 when in the duplex state, the disk control unit 43 causes the contents of the access to be reflected in the disk 32 as well.

While the data storage subsystem 3a is operating in the duplex state, if the contents of the disk 31 at a given time are to be stored on disk 32, the user gives an instruction to "dissolve the pair" to the data storage subsystem 3a. The data storage subsystem 3a, upon receiving the instruction to dissolve the pair, keeps the contents of disk 32 "as is" at the time. Thus, upon receiving the instruction to "dissolve the pair," the disk control unit 43, even if it updates from host 1a the contents of disk 31 with a write access, does not update the contents of disk 32. This state is referred to as the "simplex state."

After the simplex state is achieved, if it is desired to return disk 31 and disk 32 to the duplex state, the user instructs the data storage subsystem 3a to start copying between the disks 31 and 32. In this case, most of the data on the disk 31 and the disk 32 are the same in content. Thus the quantity of copying is small, and the shift to the duplex state can be accomplished in a relatively short time. The mirroring function can copy the contents of a disk at any desired time by making ready another disk to form a disk pair in advance, and then switching from the duplex state to the simplex state.

Disk re-mapping is the function that allows data storage subsystem 3a to change the disk identifier of each disk. For example, if the disks are small computer system interface (SCSI) disks, a target ID and a logical unit number (LUN) are assigned to each disk. Using this information, each host identifies a plurality of disks visible from the interface, and selects the disk to be accessed. The data storage subsystem 3a, by its disk re-mapping function, can freely change these identifiers as recognized by hosts 1a and 2a. For example, if disk 32 has a target ID of 0 and a LUN of 0 and disk 33 has a target ID of 1 and a LUN of 0, the data storage subsystem 3a can reverse them at certain times. Namely, disk 32 can be given a target ID of 1 and a LUN of 0, while disk 33 a target ID of 0 and a LUN of 0. It is also possible at first to assign neither a target ID, nor a LUN to the disk 33. This makes the disk invisible to hosts. Later a target ID of 1 and a LUN of 0 can be assigned to disk 33 to make it visible from hosts. Each host identifies the disk to be accessed by the target ID and the LUN. Therefore, by using the re-mapping function, the disk to be accessed can be switched without allowing hosts to become aware.

Figure 2:
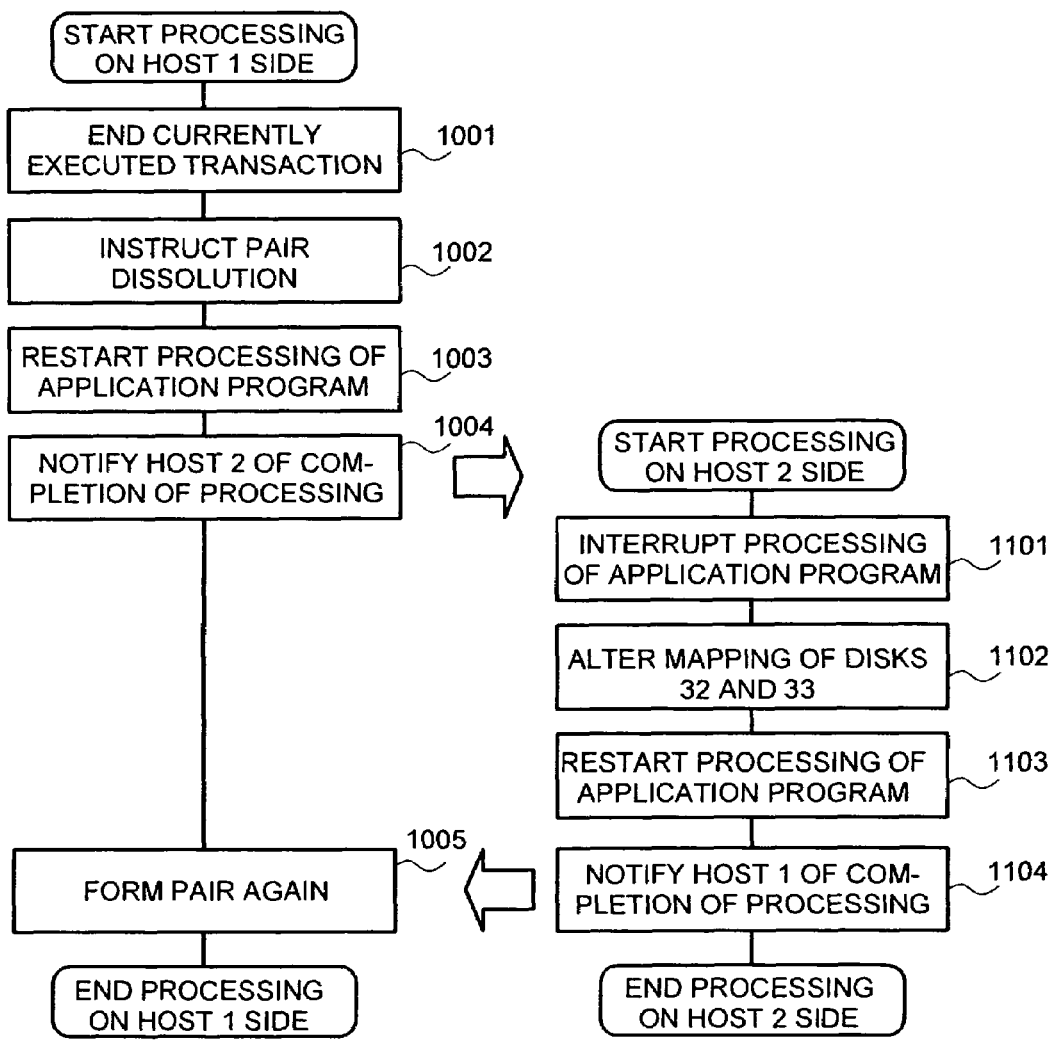
FIG. 2 is a flowchart of the process for shared use of data by application programs on host computers.

FIG. 2 is a flowchart of the process that takes place when the data of host 1a stored in the disk 31 are to be used by host 2a. The following description assumes that disk 31 and disk 32 are placed in the duplex state under such control that at least the disk 31 is visible from host 1a and at least the disk 33 is visible from host 2a. Disk 32 need not be either visible from hosts 1a and 2a, but it is assumed, for this example, to be invisible from hosts 1a and 2a. The application program 14 on host 1a is a program to perform on-line transaction processing (OLTP) on databases and the like, with frequent updating on disk 31, while the application program 24 of host 2 is a program which does not write to the disk 33. The format of data the application program 24 handles is the same as that for the application program 14, and in the initial condition a copy of the data in the disk 31 at a certain point of type is stored in the disk 33. The application program 14 and the application program 24 respectively contain inter-application communication mechanisms 141 and 241 for communication between applications via the network 5 and disk control mechanisms 142 and 242 for instructing via the interface 11 and 21 the disks to execute their mirroring function and re-mapping function. With these assumptions, the process of this embodiment is as follows.

Application program 14 first completes the transaction being executed (step 1001). This clears the contents of the disk 31 of any inconsistency. Then the disk control mechanism 142 instructs the data storage subsystem 3 to dissolve the pair, and to place disks 31 and 32 in the simplex state (step 1002). After dissolving the pair, the application program 14 resumes transaction processing (step 1003).

At step 1004, the application program 14 uses the inter-application communication mechanisms 141 to notify host 2a of the completion of processing by application program 14, i.e. transition of the disks to the simplex state. The application program 24, so notified, temporarily ends the processing of access to disk 33 (step 1101). Then the application program 24 uses the disk control mechanism 242 to re-map disks 32 and 33 (step 1102). The disk access process by the application program 24 need not be ended, but where, for example, searching of a database or the like is being performed, the timing may be that of completion of one round of processing.

At step 1103, the application program 24 resumes processing, and at step 1104 it uses the inter-application communication mechanisms 241 to notify host 1a of the completion of processing by the application program 24. As a result, application programs 24 and 14 again place disks 31 and 32 in the state of being paired (step 1005). The process thus far described enables the application program 24 to use the data of disk 31 also used by the application program 14. By repeating this process, application program 24 can use the most current data used by application program 14. While in this embodiment the re-mapping of the disks 32 and 33 at step 1102 is accomplished by the disk control unit 43, if the data storage subsystem 3a has no re-mapping function, the same process of re-mapping can be realized by making disks 32 and 33 visible from host 2a in advance, unmounting the disk 33 on the host 2a side, and then mounting disk 32 onto the directory on which the disk 33 was mounted. Applications using the same data between two systems include Data mining and Online Analytical Processing (OLAP). In this mode of implementing the invention, for example, where host 1a processes DBMS for transaction-type database processing as application program 14 and host 2a operates an OLAP server program as application program 24 to use the contents of processing by host 1a, it is possible for host 2a to use the data from the process by the OLAP server program with minimal interruption of the process of accounting by host 1a using DBMS.

Figure 3:
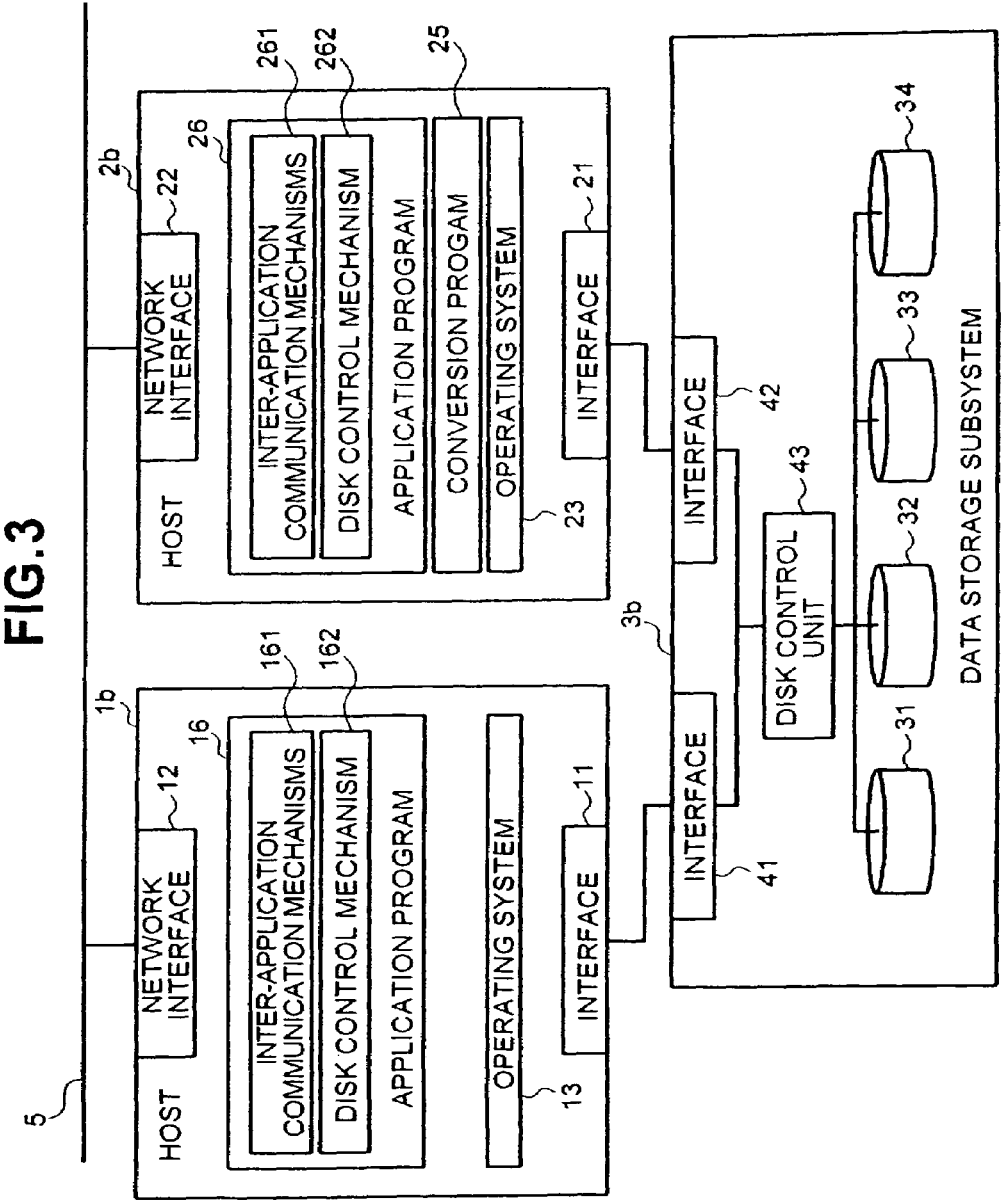
FIG. 3 is a block diagram illustrating a computer system in a second embodiment the invention.

FIG. 3 is a block diagram illustrating the configuration of a computer system in a second mode of implementing the invention. The computer system in this mode comprises a host 1b, a host 2b, a data storage subsystem 3b connected to host 1b and host 2b, and a network 5 connecting hosts 1b and 2b. Host 1b is provided with an interface 11 with the data storage subsystem 3b, a network interface 12, an operating system 13, and an application program 16. Host 2b has an interface 21 with the data storage subsystem 3b and a network interface 22, and is provided with an operating system 23, an application program 26, and a conversion program 25. The data storage subsystem 3b is further provided with a fourth disk 34 in addition to the disks 31 through 33, which functions similarly to the data storage subsystem 3a in the first embodiment.

Figure 4:
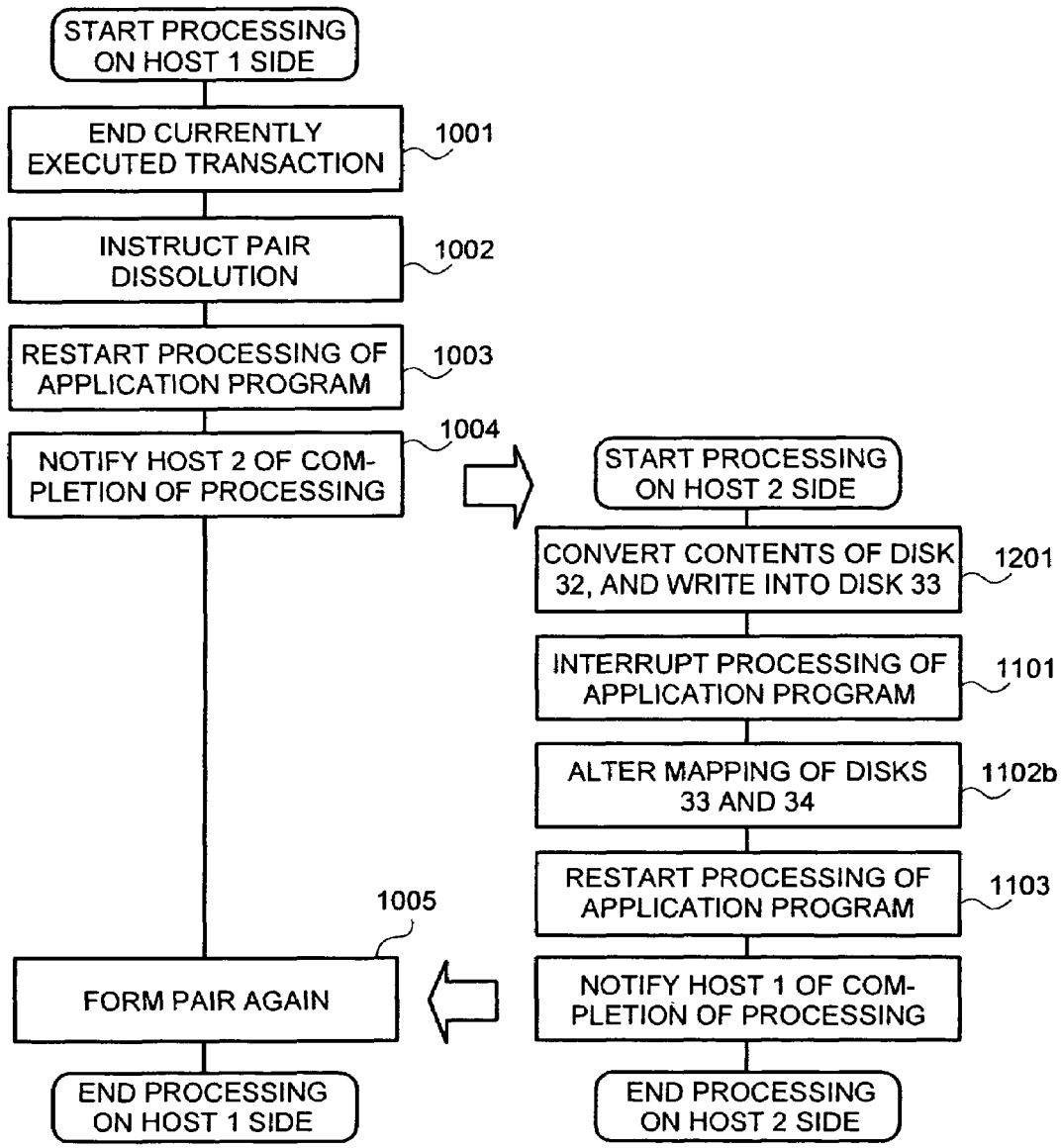
FIG. 4 is a flowchart of the process for shared use of data by application programs on host computers.

In this embodiment, the data format handled by application program 16 of host 1b differs from the data format handled by application program 26 of host 2b. Conversion program 25 is a program to convert the format of data handled by the application program 16 into the format of data handled by the application 26. To make the data on the disk 31 usable by host 2b, disks 31 and 32 are placed in the duplex state. The disk control unit 43 so controls the data storage subsystem 3b as to make at least disk 31 visible from host 1b and disks 32, 33 and 34 visible from host 2b. The application program 26 uses disk 34 to perform processing. At the start, data as of a certain time on disk 31 are converted by the conversion program 25 and stored on disk 34. FIG. 4 is a flowchart of the process performed when data on disk 31 are to be made processible by host 2b. In this process, the steps taken by host 1b are the same as those taken by host 1a in the first embodiment. From steps 1001 through 1004, the disks 31 and 32 are released from their paired state, and the disk 32 is made available for use by host 2b. Host 2b, notified by the application program 16 of host 1b, reads the contents of the disk 32 with its conversion program 25, converts the contents into a form accessible by application program 26, and stores the converted data onto disk 33 (step 1201). The application program 26, to use the data stored on disk 34, can continue processing even during operation of the conversion program 25.

Upon completion of the data conversion, host 2b temporarily ends disk access processing by application program 26 (step 1101). It then performs re-mapping between disk 33 and disk 34, and switches the disk for data access by application program 26 from disk 34 to disk 33 (step 1102b). After re-mapping of disks 33 and 34, disk access processing by the application program 26 is resumed (step 1103), and host 1b is notified of the completion of disk re-mapping by the application program 26 (step 1104). The application program 16, notified by host 2b, again places the disks 31 and 32 in the paired state. The foregoing process makes data the same as on disk 31 (thus far used by application program 16) available for use by application program 26 (step 1005).

Figure 5:
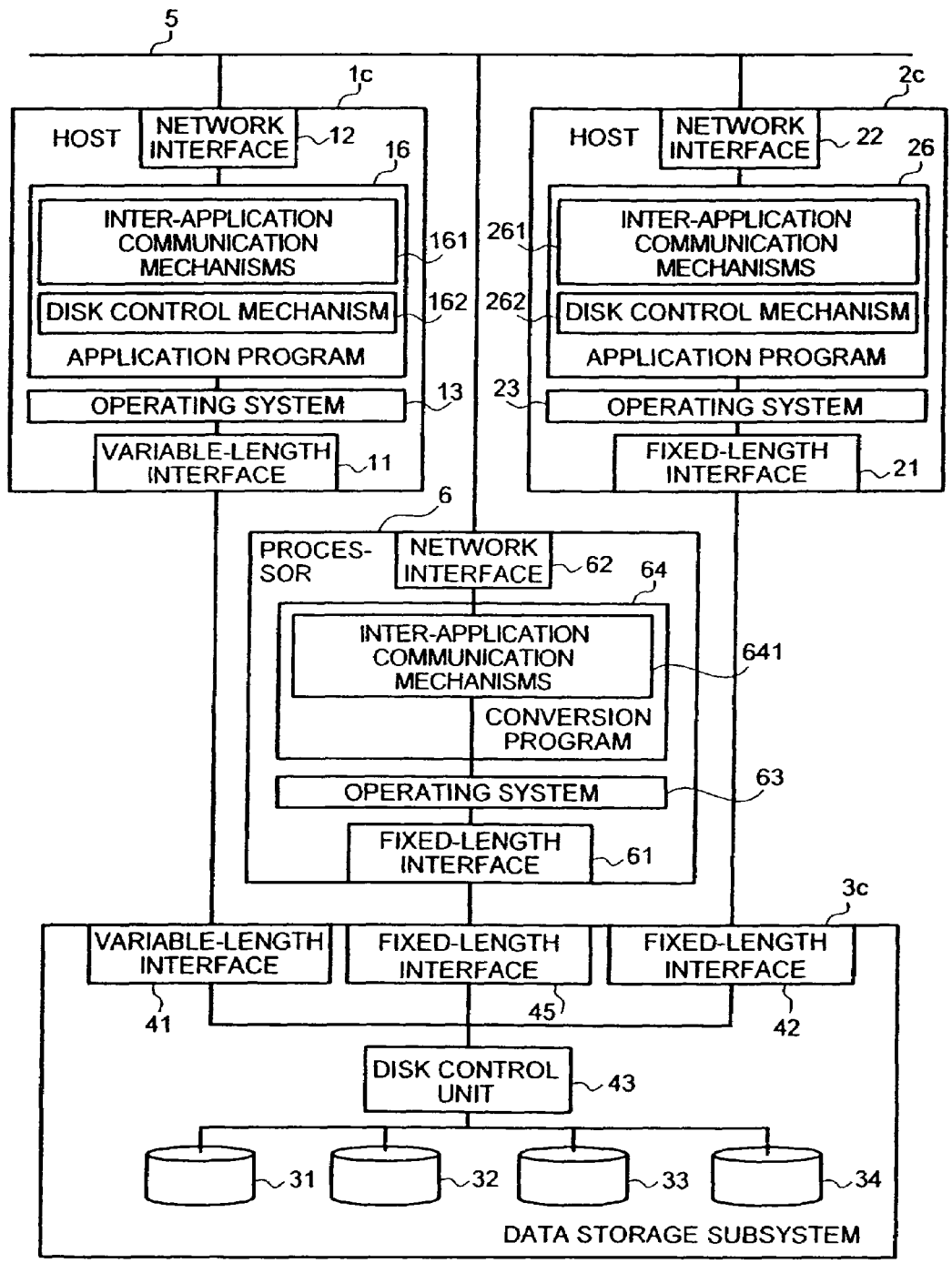
FIG. 5 is a block diagram illustrating a computer system of a third and fourth embodiment of the invention.

FIG. 5 is a block diagram illustrating a computer system in a third mode of implementing the invention. The computer system in this mode of implementation comprises a host 1c, a host 2c, and a data storage subsystem 3c connected to host 1b and host 2c. A network 5 connects the hosts to each other, and a processor 6 accompanies data storage subsystem 3c. Host 1c has, as its interfaces with the data storage subsystem 3c, a variable-length interface 11 for handling data in a count key data format (CKD format), such as a channel interface, a network interface 12, an operating system 13, and an application program 16. Host 2c has, as its interfaces with the data storage subsystem 3c, a fixed-length interface 21 for handling data in a fixed-length data format, for example, a SCSI interface, a network interface 22, an operating system 23, and an application program 26.

The data storage subsystem 3c comprises a plurality of disks 31, 32, 33 and 34, a variable-length interface 41 for connection to host 1c, a fixed-length interface 42 for connection to host 2c, a disk control unit 43, and a fixed-length interface 45 for connection to a processor 6. The disk control unit 43 controls data storage subsystem 3c to make at least disk 31 accessible by host 1c, at least disk 34 accessible by host 2c, and at least disks 32 and 33 accessible by the processor 6. Processor 6 has a fixed-length interface 61 to the data storage subsystem 3 and a network interface 62. In its memory, processor 6 stores operating system 63 and a conversion program 64.

In this embodiment, as in the second embodiment, the data format that can be handled by application program 26 differs from the data format that can be handled by application program 16. Further, host 1c stores data on disk 31 in accordance with the CKD format. Conversion program 64 of processor 6 reads, in accordance with the fixed-length format, the data in storage subsystem 3c in the CKD format, and converts them from the format of application program 16 to the format of application program 26.

For reading by the conversion program 64 of data stored in storage subsystem 3c in the CKD format, a technique disclosed in, for example, the Japanese Published Unexamined Patent Application No. Hei 9-258908 can be applied. The conversion program 64 receives from application program 16 operating on host 1c information indicating the storage position of data via the network 5. On the basis of that information, the conversion program 64 reads data from the data storage subsystem 3c in search of a storage position in the fixed-length format.

Figure 6:
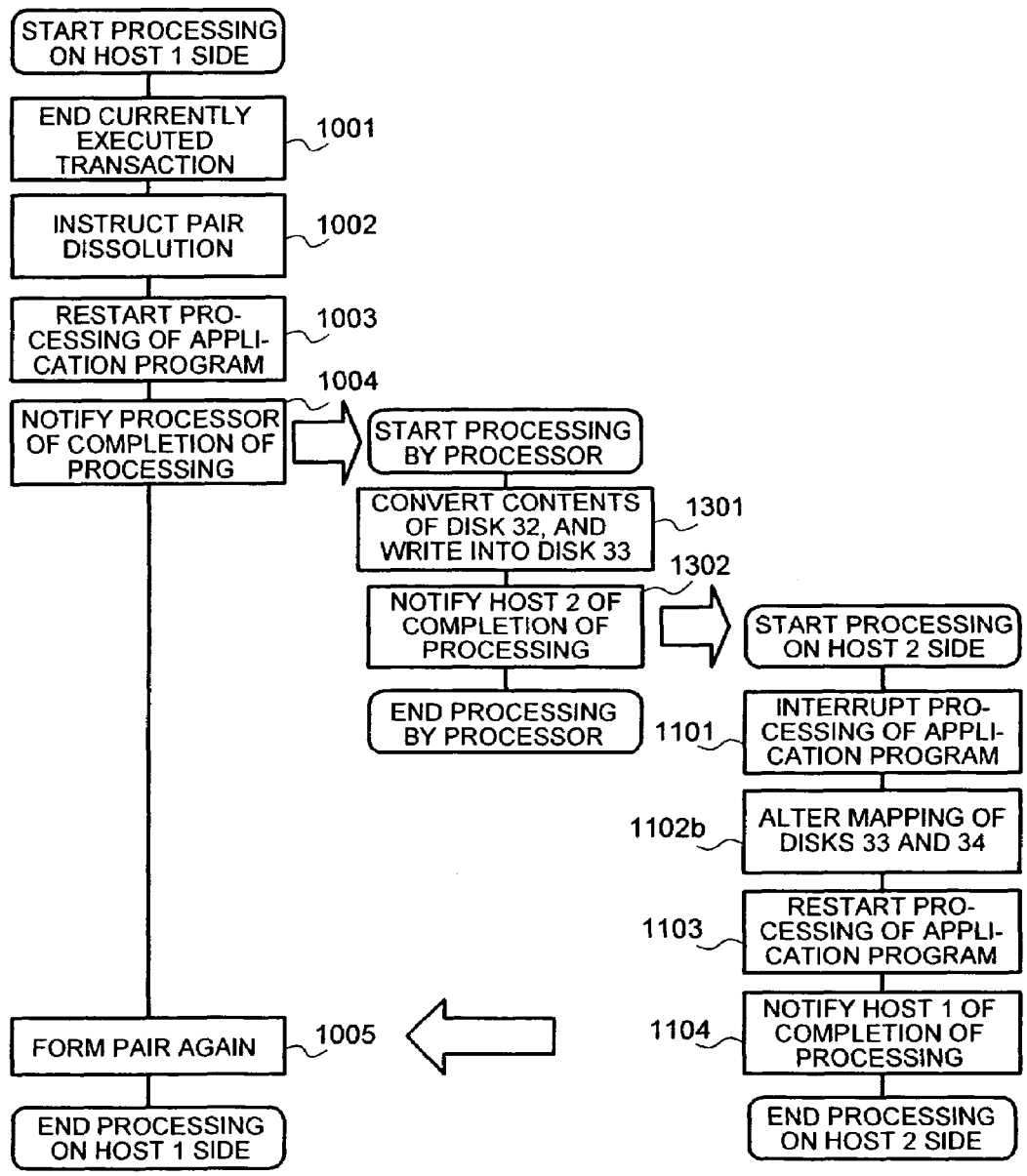
FIG. 6 is a flowchart of the process for shared use of data by application programs on host computers and by a conversion program on a processor in the third embodiment the invention.

FIG. 6 is a flowchart of the processing to make data on disk 31 available for use by host 2c. In this mode of implementation, too, disks 31 and 32 are placed basically in the duplex state as the initial state before the start of the process. The disk control unit 43 controls storage subsystem 3c to make disk 31 visible from host 1c, disk 34 visible from host 2c, and disks 32, 33 and 34 visible from processor 6.

In this mode, at steps 1001 through 1004 host 1c performs the same process as at steps 1001 through 1004 in the first or second implementation. Incidentally, the transfer of information on the storage position of data from host 1c to the processor 6 can be provided in advance of the start of this process and held by the processor 6, or it can be accomplished at the time of notice of completion of pair dissolution on host 1c side at step 1004.

The conversion program 64, notified by host 1c, reads the contents of the disk 32, converts them into a format permitting access from the application program 26, and writes the converted contents onto the disk 33. During this process, application program 16 can continue the usual processing using disk 31. Similarly, application program 26 can continue the usual processing using disk 34 (step 1301). After completion of data transfer (copying) from the disk 32 to the disk 33, the conversion program 64 notifies host 2c of the completion of processing by using an inter-application communication mechanisms 641 (step 1302).

Application program 26, notified by the processor 6, temporarily ends access to disk 34 (step 1101). After suspending access to disk 34, the application program 26, using the disk control mechanism 242, carries out re-mapping between disk 33 and disk 34, and replaces disk 33 and disk 34 with each other (step 1102b). After that, application program 26 resumes processing of access to the re-mapped disk 34 (step 1103), and notifies host 1c of the completion of processing 26 (step 1104). Application program 16, so notified by host 2c, again places disks 31 and 32 in the paired state (step 1005). The foregoing process enables hosts using different formats to share the same data.

The computer system in the fourth implementation has a similar configuration to the computer system in the third mode of implementation, except as described below.

Application program 16 of host 1c performs the usual writing of data onto disk 31 and updating thereof, and records their address and the updated data onto the disk 32. In other words, in this mode of implementation, disk 32 is used as a log disk, and data thereon are used for the restoration of data when trouble, or some other cause, interrupts processing by application program 16. The updated data are stored onto disk 32 in due order from the leading position. A series of updated data are managed on a transaction-by-transaction basis, and an identifier known as a "checkpoint" is recorded for each transaction. If the writing of data onto the disk 31 by the application program 16 is interrupted in a transaction, by reference to the update history until immediately before the latest checkpoint recorded on the log disk and correcting the data accordingly, the data at the time of completion of the transaction corresponding to that checkpoint can be restored.

In this mode of implementation, if a copy of the data on the disk 31 at a certain time remains on disk 33, the data on disk 33 can be updated with reference to the log disk (disk 32). Thus the latest result of the transaction executed by the application program 16 can be reflected in those data.

Figure 7:
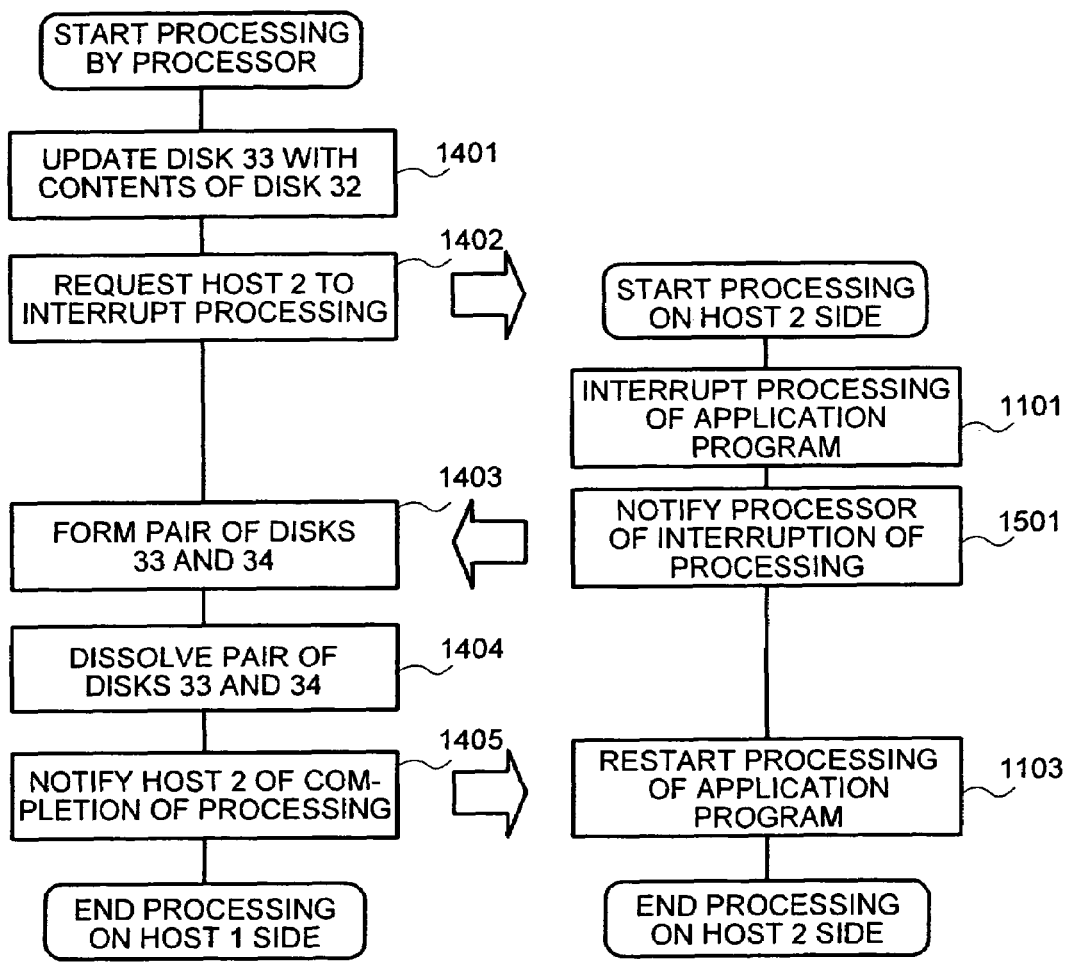
FIG. 7 is a flowchart of the process for shared use of data by application programs on host computers and by a conversion program on a processor in the fourth embodiment the invention.

FIG. 7 is a flowchart of the process to make the contents of disk 31 available for use by host 2c in this mode of implementation. The disk control unit 43 so controls the data storage subsystem 3c as to make disks 31 and 32 visible from host 1, disk 34 visible from host 2, and disks 32, 33 and 34 visible from the processor 6. The contents of disks 31 and 33 are matched before the start of this process.

Conversion program 64 holds the checkpoint ID of the updated set of data last accessed in the past process out of the updated data stored on the disk 32. The conversion program 64 reads the updated data stored on the disk 32 along the update history in order, beginning with the set of updated data identified by the checkpoint ID immediately following the checkpoint ID it holds, and there updates the contents of the disk 33 on the basis of the updated data. This update process is carried out until the updated data stored at the latest checkpoint ID recorded on the disk 32. Meanwhile, application programs 16 and 26 can continue their respective usual processing (step 1401).

After the completion of the updating of the disk 33, the conversion program 64, to cause the updated contents of disk 33 to be reflected on disk 34, requests the application program 26 of host 2c to interrupt processing by using the inter-application communication mechanisms 641 (step 1402). Application program 26, in response to the request from processor 6, interrupts the process it is executing (step 1101). After the interruption, application program 26 notifies the processor 6 of the processing (step 1501).

The conversion program 64, to place the disks 33 and 34 in the duplex state, instructs the data storage subsystem 3c to pair them (step 1403). After the pairing is completed and the duplex state has emerged in which the contents of the disk 34 have become the same as those of the disk 33, the conversion program 64 instructs the data storage subsystem 3c to dissolve the pair, and disks 33 and 34 return to the simplex state (step 1404). After disks 33 and 34 have returned to the simplex state, the conversion program 64 notifies host 2c of the completion of processing (step 1405). The application program 26, so notified, resumes the interrupted processing (step 1103). By repeating this process at required intervals, data on disk 31 used by application program 16 can be used by application program 26.

In this implementation, the contents of disk 31 can be made available for use by host 2c without interrupting the processing of the application program on host 1c. This facilitates, for example, simultaneous operation of a plurality of database programs on host 1c, or where there are a plurality of hosts in each of which a database is operating, collective processing of data by a single host.

It is assumed that a plurality of database programs are operating on host 1 and there are a plurality of databases and database logs. This makes it possible for the conversion program 64 of the processor 6 to read data out of the plurality of database logs and merge them on the processor 6 to create an integrated database on the disk 33. Host 2 is enabled to use the database integrated on the disk 33.

Figure 8:
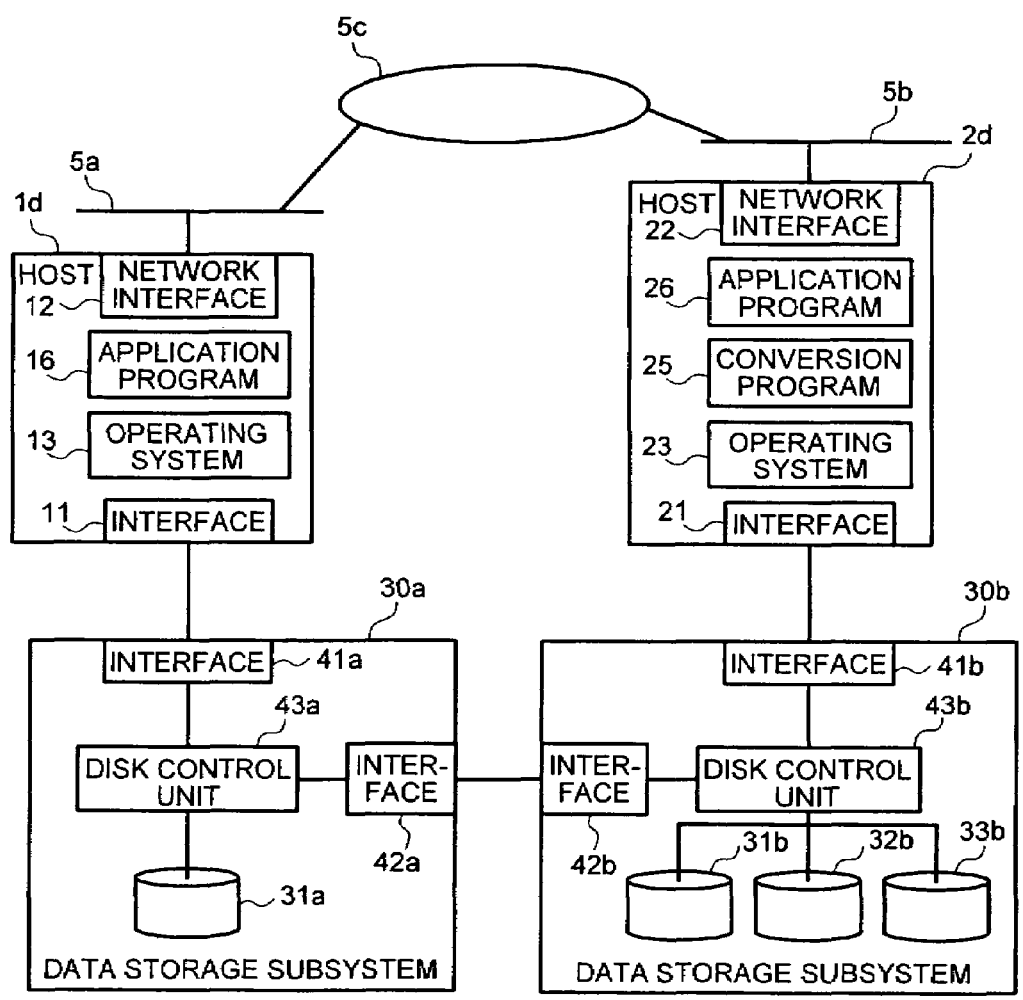
FIG. 8 is a block diagram illustrating a computer system in a fifth embodiment the invention.

FIG. 8 is a block diagram illustrating a computer system in a fifth mode of implementing the invention. The computer system in this implementation comprises a host 1d, a host 2d, a data storage subsystem 30a connected to host 1d, and a data storage subsystem 30b connected to host 2d. Host 1d and host 2d have respectively the same functions as hosts 1b and 2b in the second mode of implementation, except that host 1d and host 2d are installed in places geographically distant from each other and are connected to different LANs 5a and 5b. The LAN 5a and the LAN 5b are connected by, for example, the Internet 5c to each other.

The data storage subsystem 30a comprises a disk 31a, an interface 41a connected to host 1d, an interface 42a connected to the data storage subsystem 30b, and a disk control unit 43. Data storage subsystem 30b comprises a disk 31b, a disk 32b, a disk 33b, an interface 41b connected to host 2d, an interface 42b connected to the data storage subsystem 30a, and a disk control unit 43b. The data storage subsystem 30a and the data storage subsystem 30b are connected by their respective interfaces 42a and 42b.

Data storage subsystem 30b, like the data storage subsystem of any of the embodiments previously described, has a disk re-mapping function. The data storage subsystem 30a and the data storage subsystem 30b have a remote copying function to copy the contents of the disk in the data storage subsystem 30a to a disk in the data storage subsystem 30b via the interfaces 42a and 42b. The remote copying function is a counterpart of the earlier described mirroring function, realized here between a plurality of disk apparatuses. For instance, with reference to FIG. 8, it is supposed that the contents of the disk 31a are to be copied to the disk 32b. In this context, the disk 31a will be referred to as the original disk, and the disk 32b, as the subordinate disk.

The user instructs data storage subsystem 30a to correlate disks 31a and 32b as the original and subordinate disks, respectively, and to start copying. This instruction is given from host 1d via the interface 13. Where consoles are connected to the data storage subsystems 30a and 30b as in the first embodiment, it is also possible to send the instruction from host 1d to the console via the network.

When instructed to start copying, the disk control unit 43a transfers data to be copied to the data storage subsystem 30b via the interface 42a, and carries out copy processing. At the time of the start of copying, the data contents of the disk 31a and those of the disk 31b are not identical. The state in which data are being copied from the disk 31a to the disk 31b will be referred to as "being paired." If there is a read/write access request from host 1d to the disk 31a while the disks are "being paired," the disk control unit 43 accepts the request to allow disk 30a to be accessed and, if the contents of the disk 31a are updated by the write access from host 1d, causes the updated contents to be reflected on disk 31b.

The state in which copying has been completed and the contents of the disk 31a have been fully copied to the disk 31b is called the "duplex state." If there is a write access from host 1d to the disk 31a when in duplex state, its contents are caused to be reflected in disk 31b as well. These aspects of the procedure are the same as their respective counter parts in the earlier described mirroring function.

If it is desired, after the duplex state has been achieved, to store the state of the disk 31a at a desired time onto disk 31b, the user sends an instruction to "dissolve the pair" to the data storage subsystem 3a. The data storage subsystem 3a, upon receiving the instruction to dissolve the pair, no longer causes the updating of the data on disk 31a to be reflected on disk 31b, and stores the contents of the disk 31b as they are at that time. This state is referred to as the "simplex state." The remote copying function makes it possible, by making ready an extra disk to form a pair with a given disk and thereby to achieve the duplex state and switching to the simplex state at any desired subsequent point of time, to copy the data at that point of time.

The application program 16 of host 1d, the application program 26 of host 2d, and the conversion program 25 perform the same functions as their respective counterparts in the second embodiment. In this embodiment, the process to make the data of the disk 31a available for use by host 2d is represented by the flowchart of FIG. 4 as for the second embodiment. In the usual process, disk 31a and disk 31b are used in the paired state. Host 1d respectively dissolves and re-forms the pair of the disks 31a and 31b at step 1002 for pair dissolution and at step 1005 for pair re-formation.

On the host 2d side, at step 1201, the conversion program 25 copies the data stored on disk 31b to disk 32b while converting the data format. The application program 26, in disk re-mapping at step 102b, performs re-mapping between disk 32b and disk 33b to replace them with each other, and resumes processing by using the mutually replaced disks.

Figure 9:
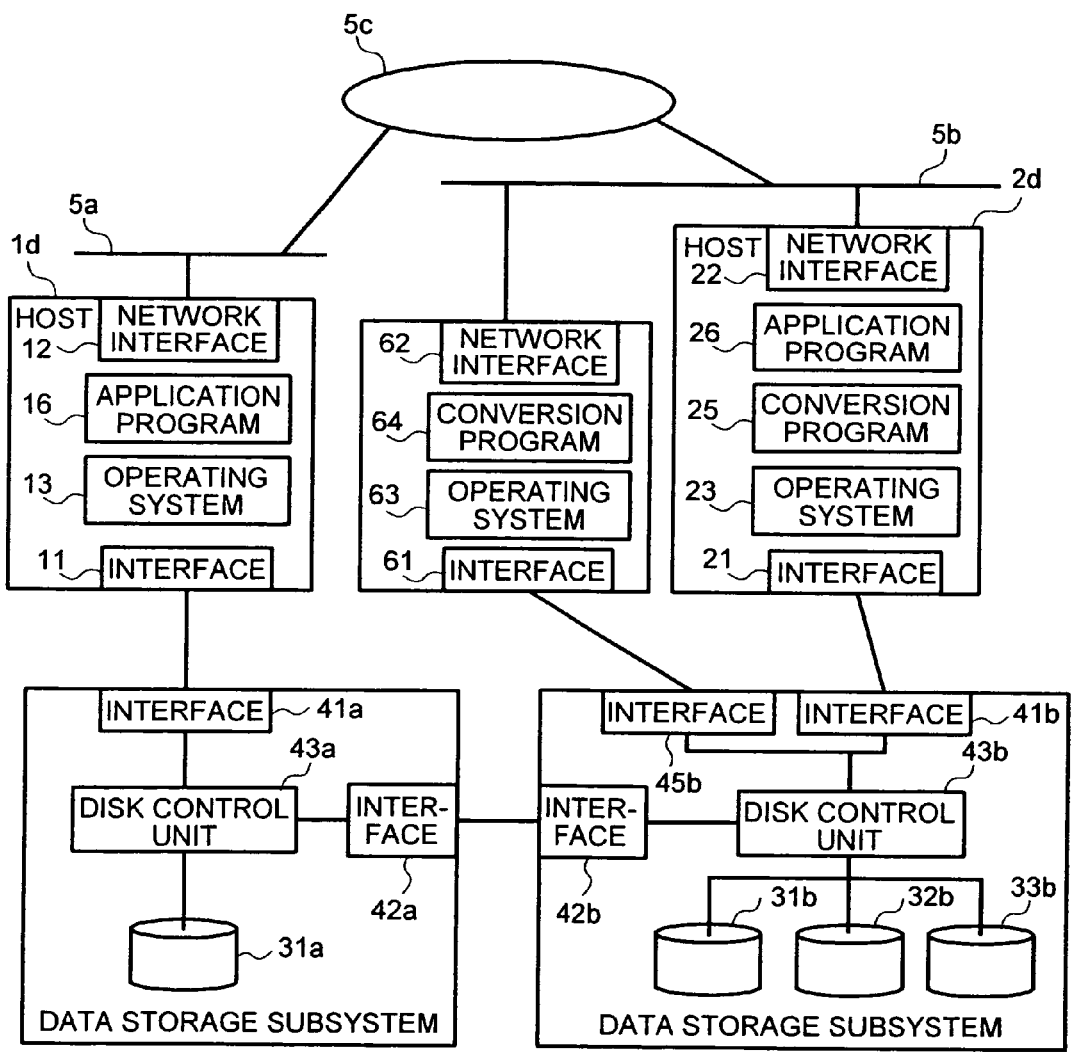
FIG. 9 is a block diagram illustrating an example of adapted configuration of the computer system in the third embodiment the invention.

With reference to this mode of implementing the invention, a computer system in which data are shared between hosts installed in geographically distant sites was described as a variation of the second mode of implementation. Similarly in a third mode of implementation, hosts 1c and 2c of FIG. 5 can be arranged in geographically distant sites as illustrated in FIG. 9 and share data between them. In this case, the processor 6 can be arranged in the same site as host 2c. The embodiments so far described allow different hosts to share data without imposing heavy loads on either the hosts or the network. They also permit the hosts to access a common file while minimizing the possibility of interruption of execution of the application program on either host.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

The preceding has been a description of the preferred embodiment of the invention. It will be appreciated that deviations and modifications can be made without departing from the scope of the invention, which is defined by the appended claims.

What is claimed is:

1. A method of sharing data in a computer system, said computer system comprising a first computer, a second computer, and a storage system comprising a disk control unit, a first disk unit, a second disk unit, and a third disk unit, the method comprising:

forming a first duplex state between said first disk unit and said second disk unit, wherein said disk control unit, in response to a write request from said first computer, stores write data associated therewith to both said first disk unit and to said second disk unit, wherein said disk control unit, in response to a write request from said second computer, stores write data associated therewith to said third disk unit;

forming a simplex state and sending a first message from said first computer to said second computer indicating forming of said simplex state, wherein said disk control unit, in response to a write request from said first computer, stores write data associated therewith only to said first disk unit, wherein said disk control unit, in response to a write request from said second computer, stores write data associated therewith to said third disk unit;

subsequent to receiving said first message performing at said second computer a re-mapping operation between said second disk unit and said third disk unit; and forming a second duplex state between said first disk unit and said third disk unit, wherein said disk control unit, in response to a write request from said first computer, stores write data associated therewith to both said first disk unit and to said third disk unit, wherein said disk control unit, in response to a write request from said second computer, stores write data associated therewith to said second disk unit.

2. A method of sharing data according to claim 1, further comprising forming a simplex state subsequent to forming said second duplex state, wherein said disk control unit, in response to a write request from said first computer, stores write data associated therewith only to said first disk unit, wherein said disk control unit, in response to a write request from said second computer, stores write data associated therewith to said third disk unit.

3. A method of sharing data in a computer system, said computer system comprising a first computer, a second computer, and a storage system comprising a disk control unit, a first disk unit, a second disk unit, a third disk unit, and a fourth disk unit, the method comprising:

forming a duplex state between said first disk unit and said second disk unit, wherein said disk control unit, in response to a write request from said first computer, stores write data associated therewith to both said first disk unit and to said second disk unit, wherein said disk control unit, in response to a write request from said second computer, stores write data associated therewith to said fourth disk unit;

forming a simplex state and sending a message from said first computer to said second computer indicating forming of said simplex state, wherein said disk control unit, in response to a write request from said first computer, stores write data associated therewith only to said first disk unit;

subsequent to receiving said first message, copying data stored in said second disk unit to said third disk unit and then performing at said second computer a re-mapping operation between said third disk unit and said fourth disk unit, wherein subsequent to said re-mapping said disk control unit accesses said third disk unit in response to I/O requests from said second computer; and re-forming said duplex state between said first disk unit and said second disk unit, wherein said disk control unit, in response to a subsequent write request from said first computer, stores write data associated therewith to both said first disk unit and to said second disk unit.

4. A method of sharing data according to claim 3, wherein said step of copying data includes steps of:
converting a first data format of data stored in said second disk unit to a second data format; and
storing said data according to said second data format to said fourth disk unit.

5. A method of sharing data according to claim 4, wherein said first data format is a count key data format and said second data format is a fixed-length block format.

6. A method of sharing data according to claim 3, wherein said computer system further comprises a processor coupled to said storage system, and said step of copying data is performed by said processor.

7. A method of sharing data in a computer system, said computer system comprising a first computer, a second computer, a first storage system coupled to said first computer and comprising a first disk unit and a first disk control unit, and a second storage system coupled to said second computer and comprising a second disk unit, a third disk unit, a fourth disk unit, and a second disk controller unit, wherein said first disk control unit and said second disk control unit are coupled via a network, the method comprising steps of:

forming a duplex state between said first disk unit and said second disk unit, wherein said first disk control unit, in response to a write request from said first computer, stores write data associated therewith to both said first disk unit and to said second disk unit, wherein said second disk control unit, in response to a write request from said second computer, stores write data associated therewith to said fourth disk unit;

terminating execution of applications in said first computer;

subsequent to said terminating, forming a simplex state, wherein said first disk control unit, in response to a write request from said first computer, stores write data associated therewith only to said first disk unit;

subsequent to said step of forming a simplex state, sending a message from said first computer to said second computer indicating said simplex state, wherein said second computer performs copying data stored in said second disk unit to said third disk unit and subsequent to said copying, performs a re-mapping between said third disk unit and said fourth disk unit so that said second disk control unit now accesses said third disk unit, in response to I/O requests from said second computer; and re-forming said duplex state between said first disk unit and said second disk unit, wherein said disk control unit, in response to a subsequent write request from said first computer, stores write data associated therewith to both said first disk unit and to said second disk unit.

8. A method of sharing data according to claim 7, wherein said step of copying data includes steps of:
converting a data format of data stored in said second disk unit to another data format; and
storing data according to said other data format to said third disk unit.

9. The storage system of claim 7, wherein data stored on said second disk unit is of a first data format and data stored on said third disk unit is of a second data format.

10. A storage system comprising:
a disk control unit; and
a plurality of disk units,
wherein said disk control unit is operable to form a duplex state between a first disk unit and a second disk unit, wherein data associated with a write request from a first computer is stored to both said first disk unit and to said second disk unit, wherein a third disk unit is accessed to service an I/O request from a second computer, wherein said disk control unit is further operable to form a simplex state between said first disk unit and said second disk unit, wherein data associated with a write request from said first computer is stored only to said first disk unit, wherein during said simplex state, an application executing on said first computer sends a message to said second computer indicating forming of said simplex state, wherein data stored in said second disk unit is copied to a third disk unit, wherein subsequent to data being copied from said second disk unit to said third disk unit, a re-mapping of said second disk unit and said third disk unit is performed so that said second disk unit is accessed to service subsequent I/O requests from said second computer, wherein another duplex state is formed between said first disk unit and said third disk unit so that data associated with subsequent write requests from said first computer are stored to both said first disk unit and to said third disk unit.

11. A storage system comprising:
a disk control unit; and
a plurality of disk units,
wherein said disk control unit is operable to form a duplex state between a first disk unit and a second disk unit, wherein data associated with a write request from a first computer is stored to both said first disk unit and to said second disk unit, wherein data associated with a write request from a second computer is stored to a fourth disk unit,
wherein said disk control unit is further operable to form a simplex state, wherein an application executing on said first computer sends a message to said second computer indicating forming of said simplex state, wherein data associated with a write request from said first computer is stored only to said first disk unit,
wherein during said simplex state, data stored in said second disk unit is copied to said third disk unit and subsequent to said copying, data associated with a write request from said second computer is stored to said third disk unit as a result of a re-mapping performed between said third disk unit and said fourth disk unit,
wherein said duplex state is re-formed between said first disk unit and said second disk unit.

12. The storage system of claim 11, wherein data stored on said second disk unit is of a first data format and data stored on said third disk unit is of a second data format.

13. The storage system of claim 12, wherein said first data format is a count key data format and said second data format is a fixed-length block format.

14. A storage system comprising:
a disk control unit;
a plurality of disk units; and
a network connecting at least some of said disk units,
said disk control unit being operable to copy data stored in a first disk unit to a second disk unit via said network,
said disk control unit being operable to form a duplex state between said first disk unit and said second disk unit, wherein data associated with a write request from a first computer is stored to both said first disk unit and to said second disk unit, wherein data associated with a write request from a second computer is stored to a third disk unit,
said disk control unit further being operable to form a simplex state, wherein an application executing on said first computer sends a message to said second computer indicating forming of said simplex state, wherein data associated with a write request from said first computer is stored only to said first disk unit,
wherein during said simplex state, data stored in said second disk unit is copied to a third disk unit and, subsequent to said copying, said second computer accesses said second disk unit as a result of a re-mapping performed between said second disk unit and said third disk unit,
wherein another duplex state is formed between said first disk unit and said third disk unit so that data in subsequent write requests from said first computer are stored in both said first disk unit and said third disk unit.

* * * * *